May 1, 1962     M. N. STRAMEL     3,032,011
CATTLE SPRAYING APPARATUS
Filed Aug. 19, 1959     2 Sheets-Sheet 2

Malcolm N. Stramel
INVENTOR.

United States Patent Office 3,032,011
Patented May 1, 1962

3,032,011
CATTLE SPRAYING APPARATUS
Malcolm N. Stramel, Hanston, Kans.
Filed Aug. 19, 1959, Ser. No. 834,796
9 Claims. (Cl. 119—159)

This invention relates to improvements in apparatus for spraying cattle, especially cows, with insecticide for ridding such cattle of insects and especially the annoyance of flies.

The primary object of the invention is to provide apparatus which is adapted to be readily set up in a field, barnyard, or other suitable place, for operation to spray liquid insecticide against the sides and downwardly over the back of a cow in response to lowering of the cow's head for feeding, or licking salt, from a feedbox or manger.

Another object is to provide apparatus for the above purposes which includes stalls for cows, or other cattle, adjustable as to width for confining therein cattle of different sizes to closely restrict the cattle during spraying, the stalls comprising side spray pipes for ejecting spray jets of liquid insecticide against the sides and belly of cows.

Still another object is to provide apparatus for the above purposes which is readily portable from place to place, economical to manufacture, and durable and safe to use.

Figure 1:
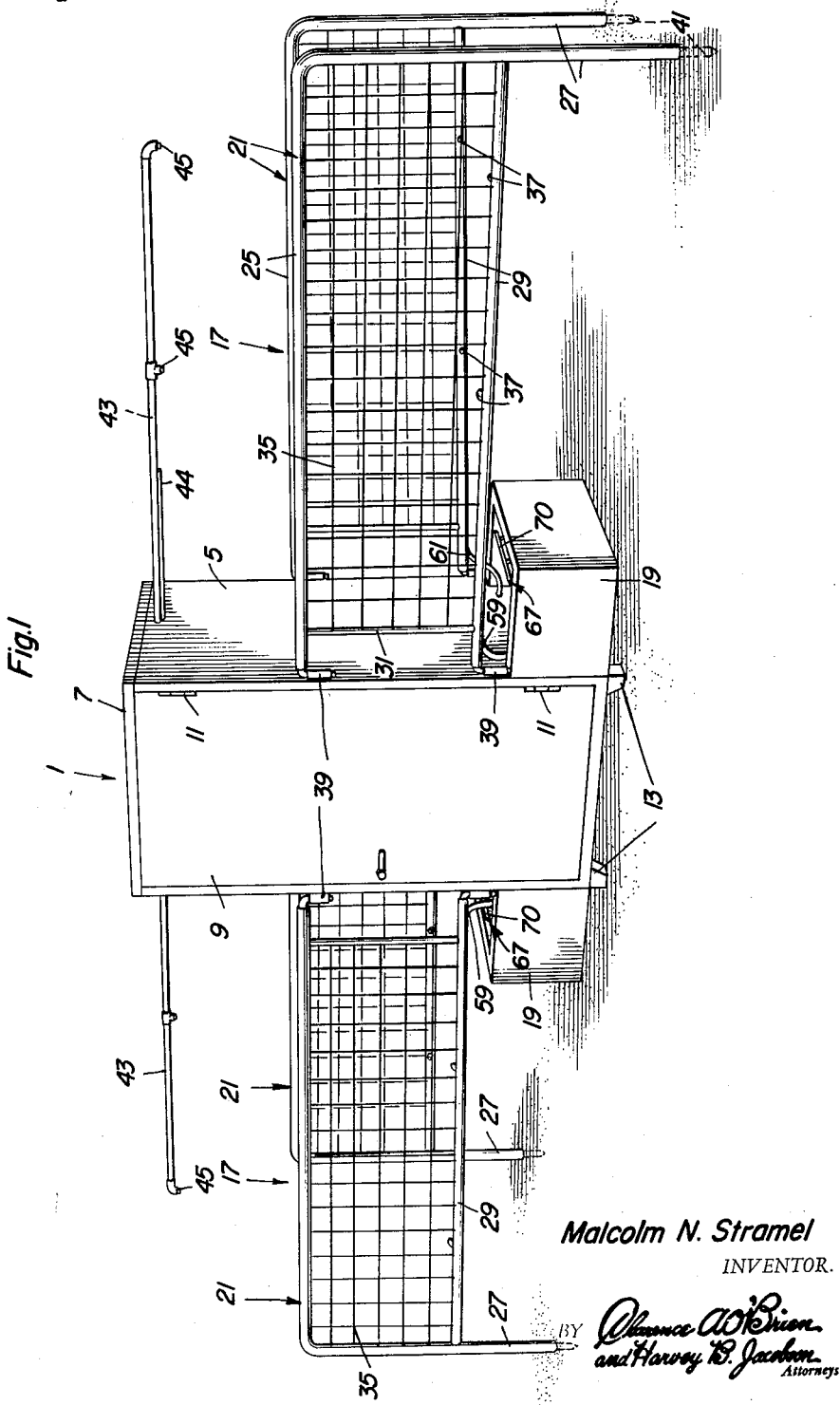
Figure 2:
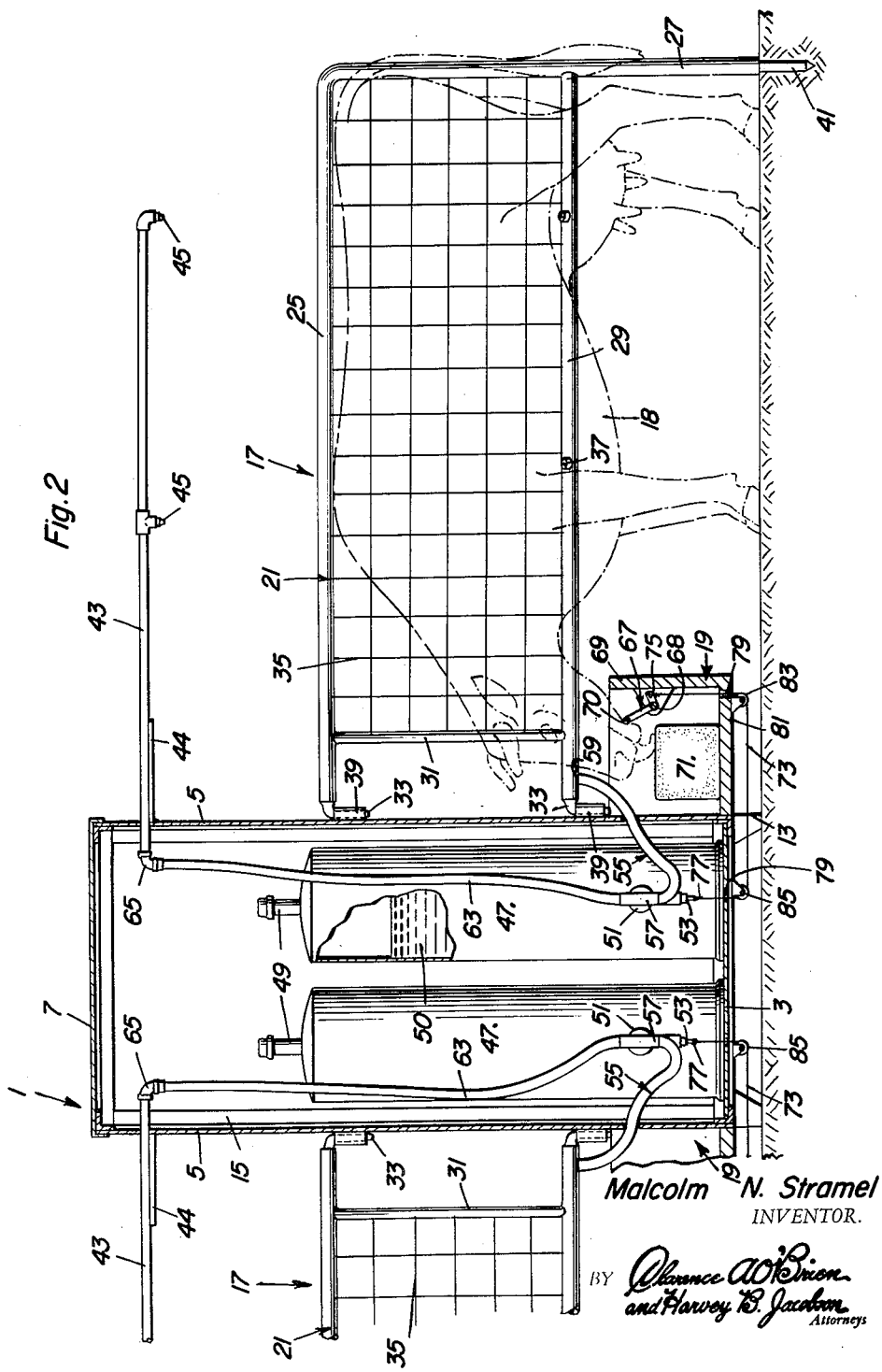

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the apparatus in a preferred embodiment thereof, and FIGURE 2 is an enlarged fragmentary view partly in side elevation and partly in vertical section.

Referring to the drawings by numerals, the apparatus of this invention, as shown, comprises a vertically elongated, narrow housing designated generally by the numeral 1 and which may be of any suitable construction but is preferably of rectangular cross-section with a bottom 3, sides 5, a flat roof 7, a front door 9 hingedly mounted as at 11, and short corner, supporting legs 13. As shown, the housing 1 is constructed of sheet metal suitably secured to an angle iron internal frame 15.

A pair of like cattle stalls 17 are provided at two opposite sides 5 of the housing 1 to extend outwardly from said sides 5 for each confining therein cattle, such as a cow 18, to feed or lick salt from a pair of feedboxes or mangers 19, suitably secured at the bottom portion of the housing 1 on said opposite sides 5.

The stalls 17 each comprise a pair of side frames 21. Each side frame 21 comprises a right angled tubular member having a horizontal upper portion 25 at substantially the level of the back of a cow 18 occupying the stall, and which terminates in a downwardly extending upright, rear end portion 27, a horizontal lower tubular member 29 extending forwardly from the rear end portion 27 at a level slightly above the belly of a cow 18 in the stall 17, an upright rod 31 cross connecting the tubular member 29 and the horizontal portion 25 adjacent downturned front ends 33 on said member 29 and said portion 25, and wire mesh 35 extending between the portion 25 and member 29 and between the portion 27 and the rod 31.

The tubular lower member 29 of each side frame 21 is closed at its ends and provided with spray jet nozzles 37 extending horizontally inwardly of the stall 17 and spaced apart longitudinally of said member 29.

The front ends 33 of the upper portion 25 and the lower member 29 of each side frame 21 are removably inserted downwardly in hinged barrels 39 on the adjacent side 5 of the housing 1 so that the side frames 21 are removable and replaceable, and laterally swingable to widen or narrow the stall to closely confine a cow or the like in the stall, as may be required. The upright rear end portion 27 of each side frame 21 terminates in a sharp pointed stake 41 for anchoring in the ground to retain the frame 21 in adjusted position. The tubular portions 25, 27 and the member 29 may be formed of stock pipe.

A pair of horizontal overhead spray pipes 43 extend out of the aforesaid opposite sides 5 of the housing 1, centrally and horizontally over and above the stalls 17 and are provided with longitudinally spaced depending spray jet nozzles 45 for spraying downwardly over the backs of a cow or the like, occupying the stalls. The spray pipes 43 are braced by lateral support arms 44 on the housing 1.

Means is provided for supplying liquid insecticide under pressure to the lower tubular members 29 of the side frames 21 and to the overhead spray pipes 43 to issue from the spray jet nozzles 37, 45 and which comprises the following.

A pair of storage tanks 47, preferably cylindrical, are provided in the housing 1 on the bottom 3. The tanks 47 are preferably pre-charged through suitable vertical inlet necks 49 on the tops thereof with a suitable liquid insecticide 50 and air or other gas under pressure from any suitable source.

A pair of discharge valves 51 are provided in the tanks 47 respectively, adjacent the bottoms of said tanks. The discharge valves 51 form, per se, no part of the invention and may be of any conventional normally closed type opened by downward movement of tensioned valve stems 53 depending from said valves. A pair of flexible, suitably branched hose lines 55 are connected to manifolds 57 on the valves 51 and are suitably extended out of the housing 1 to and in communication with the front end portions of the lower members 29, as at 59, 61, to convey the insecticide to said lower members 29 of the side frames 21. A pair of flexible hose lines 63 in the housing 1 extend from the manifolds 57 and are connected by elbow fittings 65 to inner ends of the overhead spray pipes 43 to convey the insecticide to said overhead pipes.

A pair of bell-crank-type rocker frames 67 are pivotally mounted, as at 68, in the feedboxes or mangers 19 on the front walls 69 thereof for swinging in vertical planes from a normal position so that when a cow 18 lowers its head into the box or manger 19 to feed therefrom or lick salt 21 therein, the head of the cow will engage an upper rod 70 of the frame 67 and rock the frame 67 counterclockwise as viewed in the drawings. The rod 70 extends longitudinally in the boxes or mangers 19 and horizontally.

The frames 67 are operatively connected to the valve stems 53 to open the discharge valves 51 in response to such swinging of the frames 67 and by the following means. A pair of pull cables 73 are terminally connected, as at 75, to the frames 67, below the pivots 67 and, as at 77, to the valve stems 53. The cables 73 extend downwardly out of openings 79 in the bottoms 81 of the boxes or mangers 19 and upwardly into the housing 1 through the bottom 3 of the housing 1 and are trained around guide pulleys 83, 85 on said bottoms 81, 3, below said bottoms, the arrangement being such that rocking of the rocker frames 67 counterclockwise, as viewed in the drawings, will result in pull on said cables.

The operation of the invention will be readily understood. The tensioned valve stems 53 exert pull in one direction on the cables 73 to rock the rocker frames 67 into the approximate normal position shown in FIGURE 2. A cow 18 entering a stall to feed out of or lick salt 71, in the box or manger 19 of the stall, lowers its head, and engages its lower jaw with the rod 70 of the rocker frame 67 in that box or manger and thereby rocks said rocker frame counterclockwise, as shown in FIGURE 2. This results in pull on the cable 73 that is connected to the rocker frame 67 so as to exert pull on the valve stem 53 of one of the tanks 47 associated with the stall 17. This causes the discharge valve 51 of that tank 47 to open whereupon insecticide is sprayed, under pressure, out of the spray jets 37 and 45 associated with the stall entered by the cow. To adjust the side frames 21 of the stall for the purpose previously set forth, said side frames 21 are raised manually to slide the front ends 33 of the portion 25 and member 29 upwardly in the hinged valves 39 so as to lift the stakes 41 out of the ground. Then the side frames 21 may be swung laterally into adjusted position and lowered to lower the stakes 41 into the ground, in a manner which will be clear, to retain said side frames 21 in adjusted positions.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. Apparatus for spraying a cow with insecticide comprising a housing for setting up in a field or the like and having sides, at least one stall comprising a pair of laterally spaced side frames extending outwardly from one side of the housing for confining a cow in the stall, said sides including spray pipes for spraying insecticide against opposite sides of a cow, means in said housing for dicharging insecticide under pressure, means connecting the insecticide discharging means to said spray pipes in communication therewith including a normally closed discharge control valve, a manger in the forward end portion of the stall, and means for opening said valve including a pivoted member in said manger swingable in response to lowering of a cow's head into the manger, and means operatively connecting said member to said valve.

2. The combination of claim 1 including an overhead downwardly spraying pipe extending horizontally above said stall intermediate said sides, and a hose line in said housing connecting said valve to said overhead pipe to convey the insecticide to said overhead pipe under control of said valve.

3. The combination of claim 1, said pivoted member comprising a rod extending longitudinally of said manger and downwardly movable by a cow's head lowered against the rod.

4. The combination of claim 1, said means operatively connecting said member to said valve comprising a pull cable terminally connected to said member and valve.

5. The combination of claim 1, said side frames being hinged to said side of the housing for lateral swinging to vary the width of the stall for cows of different sizes.

6. The combination of claim 5, and ground penetrating means on said side frames for anchoring the same in different laterally swung positions.

7. An animal spraying apparatus comprising a supporting structure, an animal receiving stall comprising tubular side frames, spray nozzles mounted on said side frames, means connected to the side frames for delivering a fluid thereto under pressure, means operable by the head of an animal in the stall for controlling the delivery of the fluid and means pivotally connecting the side frames to the supporting structure for lateral swinging movement for varying the width of the stall and for adjusting the nozzles toward or away from the animal.

8. An animal spraying apparatus comprising a housing, an animal receiving stall extending from said housing, a spray pipe on the housing extending longitudinally over the stall, said stall including tubular side frames, spray nozzles on the side frames, said side frames being hingedly connected at one end to the housing for lateral swinging movement for varying the width of the stall, for centering an animal therein under the spray pipe and for adjusting said nozzles toward or away from the animal, means in the housing connected to the spray pipe and the tubular frames for delivering a fluid thereto under pressure, and means operable by the head of the animal for controlling the fluid.

9. An animal spraying apparatus comprising a housing, an animal receiving stall extending from said housing, a spray pipe on the housing extending longitudinally over the stall, said stall including tubular side frames, spray nozzles on the side frames, said side frames being hingedly connected at one end to the housing for lateral swinging movement for varying the width of the stall, for centering an animal therein under the spray pipe and for adjusting said nozzles toward or away from the animal, means in the housing connected to the spray pipe and the tubular frames for delivering a fluid thereto under pressure, and means for controlling the fluid, the first named means including a normally closed valve, the second named means including a manger mounted in the stall, and a lever device in the manger adapted to be actuated by the animal feeding therefrom and operatively connected to the valve for opening same.

References Cited in the file of this patent

UNITED STATES PATENTS

| 1,273,311 | Barnes | July 23, 1918 |
| 1,767,560 | Snyder | June 24, 1930 |
| 2,480,600 | Paul | Aug. 30, 1949 |
| 2,524,641 | Suttles | Oct. 3, 1950 |
| 2,678,629 | Meyer | May 18, 1954 |

FOREIGN PATENTS

| 116,202 | Australia | Nov. 24, 1942 |